(No Model.)
M. A. STONE.
MEANS FOR REPAIRING PUNCTURED SHEET METAL ARTICLES.
No. 564,850.          Patented July 28, 1896.
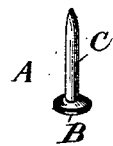
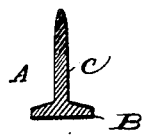
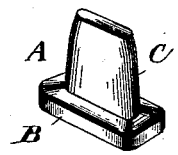
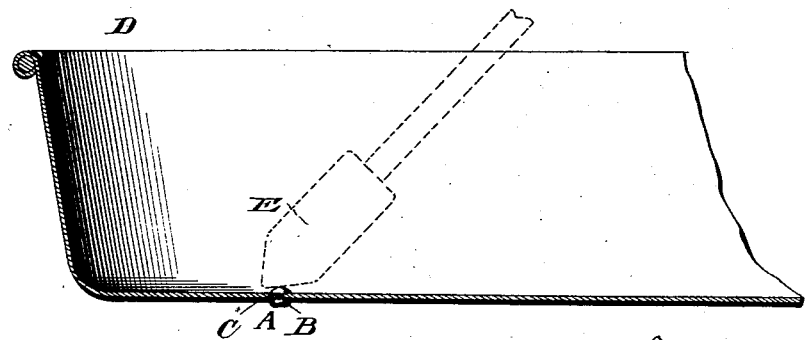
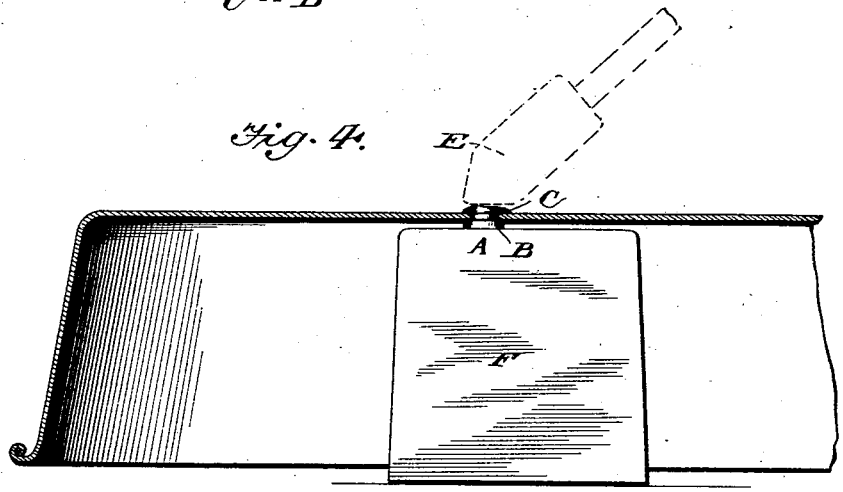
Witnesses
Frank Barry
Finis D. Morris
Inventor
Marcia A. Stone
by Bishop & Imirie
Attorneys

UNITED STATES PATENT OFFICE.

MARCIA A. STONE, OF FOSTER CENTRE, RHODE ISLAND.

MEANS FOR REPAIRING PUNCTURED SHEET-METAL ARTICLES.

SPECIFICATION forming part of Letters Patent No. 564,850, dated July 28, 1896.

Application filed July 22, 1895. Serial No. 556,805. (No model.)

*To all whom it may concern:*

Be it known that I, MARCIA A. STONE, a citizen of the United States, residing at Foster Centre, in the county of Providence and State of Rhode Island, have invented certain new and useful Improvements in Means for Repairing Punctured Sheet-Metal Articles; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention is a device for repairing punctured cooking vessels and other articles of sheet-metal manufacture; and it consists in a stem adapted to be inserted through the puncture and having its end adapted to be fused down to cover and close the same, and a heat-resisting base to support the vessel and hold the stem in position.

In the accompanying drawings, which fully illustrate my invention, Figure 1 is a perspective view of my improved solder-block employed in mending utensils in accordance with my invention. Fig. 2 is a similar view of another form of block. Figs. 3 and 4 are sectional views showing alternative applications of my method of mending, and Fig. 5 is a detail sectional view of the soldering-block.

Kitchen utensils and other domestic articles of sheet-metal manufacture are exceedingly liable to damage and frequently receive punctures which destroy their utility unless neatly filled. As the housewife usually requires the vessel at the very time it is punctured and cannot wait until it can be mended by a skilled mechanic, she generally repairs the damage by simply drawing a piece of cloth or fabric through the perforation. This is obviously a disagreeable makeshift, as the vessel cannot be repaired neatly in this manner, and, as it is never certain that the cloth is absolutely clean, it is seen that the vessel cannot be safely used for cooking purposes.

It is the object of my invention to provide means for quickly and neatly repairing a punctured vessel, so that it can be used without fear of any deleterious effects and so that when mended it will present an attractive appearance.

In carrying out my invention I employ a soldering-block A, which is constructed with a base or support B, and a stem C, rising from the said base. The blocks will be made in a number of sizes and in various shapes, so as to accommodate any size or form of puncture and entirely fill the same when applied thereto in accordance with my invention.

The preferred method of mending vessels is that shown in Fig. 3, in which figure the soldering-block is inserted through the puncture from the outside of the vessel D and the inner end of the stem is then melted by the application of any convenient heated tool, such as the soldering-iron E. The melted portion of the soldering-block of course flows around the stem, so as to entirely fill the puncture in the vessel and when permitted to cool will harden, so as to effectually prevent leakage therethrough.

It may be preferred at times and is within the scope of my invention to insert the soldering-block outward through the puncture, as illustrated in Fig. 4, and melt the end of the stem against the outer side of the vessel. In this case the soldering-block must be supported within the vessel by a block F of some kind.

It will be seen from the foregoing description, taken in connection with the accompanying drawings, that my invention provides means whereby any housewife can quickly repair a punctured vessel, so that it will be practically as good as new and will present a neat appearance when mended. The base of the block serves as a support for the vessel while being mended and the weight of the vessel holds it in position, so that the stem cannot withdraw through the opening. The soldering-block preferably is made of metals of different degrees of hardness, the tip or end of the stem being fusible at a low temperature, as shown most clearly in Fig. 5. This form of block guards against the too great melting of the block, as will be readily understood.

I am aware that the vent-holes in cans have heretofore been closed by fusing a soldering-disk, which is provided with a teat on one side to engage the vent-hole and thereby support the disk in position to be acted on by the soldering-iron, but I make no claim to such a device as being of my invention. In this method of closing vent-holes the disk is melted and the teat forms a support or guide to hold the disk while it is being melted. When operating my invention, the disk is never changed, but acts entirely as a support for the stem and for the vessel being repaired. Were my disk or base melted, the efficiency and desirability of the device would be seriously impaired. The fusing of my device is preferably confined to the tip of the stem, which is rather long in order to provide sufficient metal for the proper fusing and soldering.

Having thus described my invention, what I claim, and desire to secure by Letters Patent, is—

As a new article of manufacture, a device for closing punctures in sheet-metal articles consisting of a heat-resisting disk or base of higher degree of fusibility adapted to support the punctured article and a stem rising from the said base through the puncture, the tip or extremity of said base being fusible at a lower temperature and adapted to be fused down onto the article to close the puncture.

In testimony whereof I affix my signature in presence of two witnesses.

MARCIA A. STONE.

Witnesses:
GRACE M. WINSOR,
CLARISA G. WINSOR.